United States Patent [19]

Givens

[11] 3,828,189
[45] Aug. 6, 1974

[54] LOGGING TECHNIQUE FOR ASSAYING FOR URANIUM IN ROCK FORMATIONS

[75] Inventor: Wyatt W. Givens, Dallas, Tex.

[73] Assignee: Mobil Oil Corporation, New York, N.Y.

[22] Filed: Nov. 29, 1972

[21] Appl. No.: 310,612

[52] U.S. Cl.................. 250/253, 250/264, 250/270
[51] Int. Cl............................................. G01t 1/16
[58] Field of Search............. 250/83.1, 83.6 W, 253, 250/264, 270

[56] References Cited
UNITED STATES PATENTS

| | | | |
|---|---|---|---|
| 2,390,433 | 12/1945 | Fearon | 250/83.6 W |
| 2,543,676 | 2/1951 | Thayer et al. | 250/83.1 |
| 2,991,364 | 7/1961 | Goodman | 250/83.6 W |
| 3,222,521 | 12/1965 | Einfeld | 250/83.1 |
| 3,256,438 | 6/1966 | Armistead | 250/83.6 W |
| 3,420,998 | 1/1969 | Mills | 250/83.1 |
| 3,686,503 | 5/1970 | Givens et al. | 250/83.1 |

*Primary Examiner*—James W. Lawrence
*Assistant Examiner*—Harold A. Dixon
*Attorney, Agent, or Firm*—Andrew L. Gaboriault; William D. Jackson

[57] ABSTRACT

Disclosed is a uranium exploration technique for determining the uranium content of a formation traversed by a borehole. A delayed fission neutron assay log is obtained by irradiating the formation with repetitive bursts of fast neutrons and detecting delayed neutrons resulting from neutron fission of uranium at time intervals between the fast neutron bursts and after dissipation of the neutrons originating in the bursts. In addition, a response log is obtained by irradiating the formation with a source of fast neutrons whereby the neutrons from this source are moderated in the formation to lower energy levels and are subject to absorption. Secondary radiation attendant to these lower energy neutrons is recorded in order to obtain a log representative of the response of the formation to moderation and absorption of the neutrons. The two logs thus obtained are correlated in order to determine a corrected value of uranium content of the formation.

16 Claims, 5 Drawing Figures

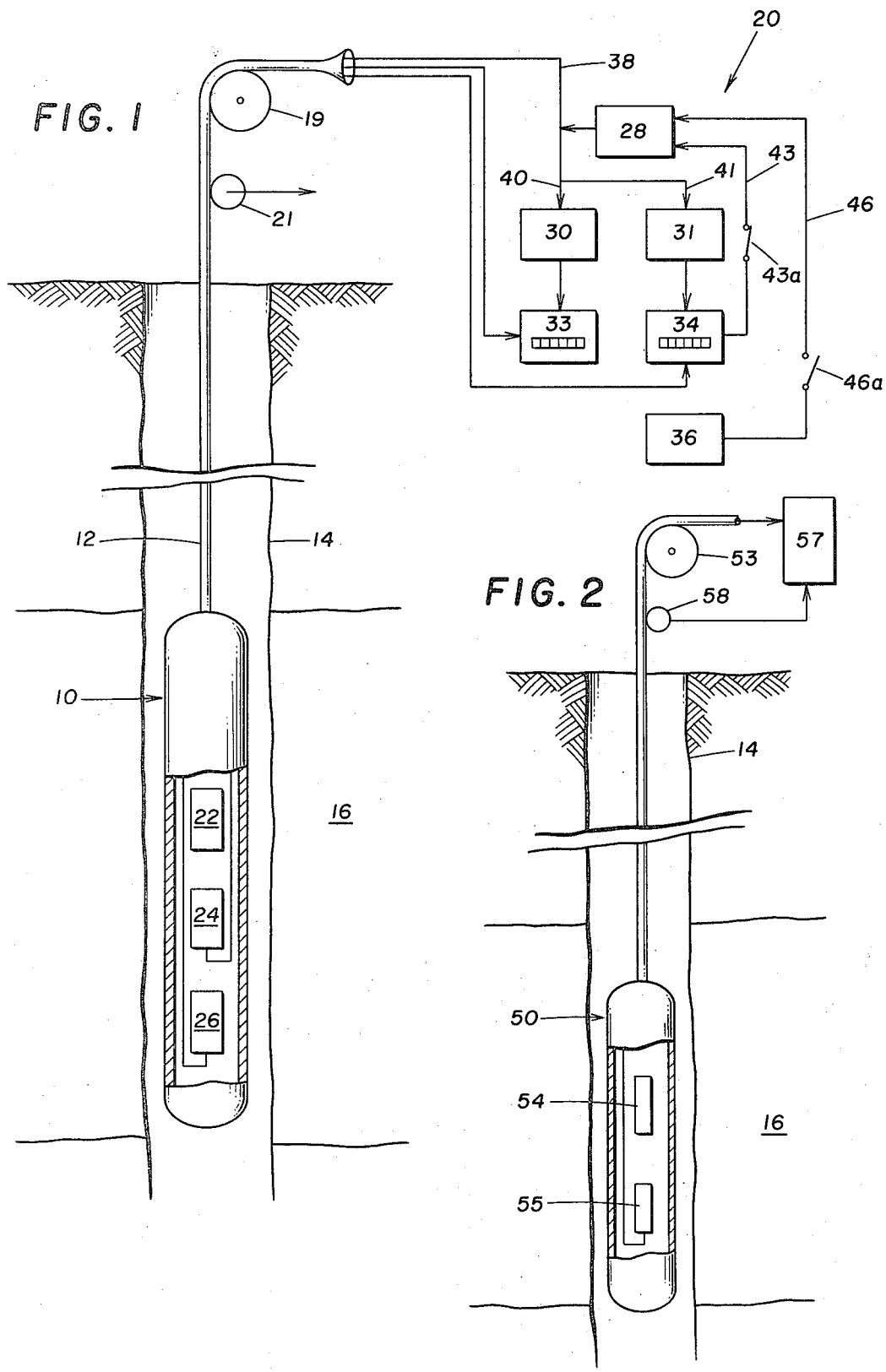

3,828,189

LOGGING TECHNIQUE FOR ASSAYING FOR URANIUM IN ROCK FORMATIONS

BACKGROUND OF THE INVENTION

This invention relates to a radioactive logging technique and more particularly to a delayed fission neutron uranium assaying technique.

As described in U.S. Pat. No. 3,686,503 to Givens et al., natural earth formations may be characterized with regard to their uranium content on the basis of delayed neutrons resulting from neutron fission of uranium. When a formation containing a uranium ore is irradiated with neutrons, the uranium nuclei react to neutron bombardment by breaking into smaller nuclear fractions which are normally referred to as fission products. The fission of uranium is attended by the emission of prompt neutrons immediately upon occurrence of the fission reaction and also by the emission of delayed neutrons subsequent to the fission process. The delayed neutrons are emitted by the fission products for an appreciable length of time following the fission reaction. The half lives of the six prominent groups of delayed fission neutrons resulting from fission of uranium by thermal neutrons or by fast neutrons vary from about 0.23 to 55.72 seconds with the most abundant delayed neutron group exhibiting a half life of about 2.30 seconds. The aforementioned patent to Givens et al. discloses a subsurface assaying operation which is carried out by locating in a borehole adjacent a formation of interest a logging tool which includes a source of fast neutrons and a thermal neutron detector. The formation is irradiated with repetitive bursts of fast neutrons and subsequent to each burst and after dissipation of the original source neutrons, delayed neutrons resulting from neutron fission of uranium are detected. The output from the detector is then recorded in order to obtain a log indicative of the uranium content of the formation.

The use of fast neutron irradiation for the detection of uranium has also been explored in a paper by Jan A. Czubek, "Pulsed Neutron Method for Uranium Well Logging," GEOPHYSICS, Vol. 37, No. 1, Feb. 1972, pp. 160–173. Czubek examines several phenomena associated with fast neutron irradiation of uranium bearing formations and concludes that three can be employed to advantage in uranium detection techniques. Those which Czubek proposes for use as uranium content indicators are (1) epithermal neutron intensity resulting from prompt thermal neutron fission, (2) thermal neutron intensity from delayed thermal neutron fission, and (3) thermal neutron intensity from delayed fast neutron fission. The author also sets forth a number of relationships including equations 12 and 31 as set forth below:

$$R_f(t_1, \Delta t, t_T) = N \int_{t_1}^{t_2} R_f(t)\, dt$$

$$= Q \frac{t_T}{\Delta T} \sum_D (v_{cd}) v_{Cd} \frac{t_s}{\tau_f} \nu \tau^2$$

$$\cdot e^{-(t_1/\tau)}(e^{\Delta T/\tau} - 1)(1 - e^{-\Delta T/\tau}) \quad (12)$$

$$= p_U \frac{\sigma_f \alpha_1 \rho N_0}{A_{235} 10^4} \nu Q \frac{t_T}{\Delta T} \sum_D (v_{cd}) \frac{v_{Cd}}{\bar{v}}$$

$$\cdot \frac{t_R}{\left(\sum_a\right)^2} e^{-t_1/\tau}(e^{\Delta T/\tau} - 1)(1 - e^{-\Delta t/\tau}),$$

$$R_T(t_T) = p_U Q \bar{v} \sum_{D\rho} N_0 10^{-4} (\Delta t/T) t_T$$

$$\cdot \left\{ \frac{\sigma_f \alpha_1}{A_{235} \sum_a} \sum_{i=1}^{6} \frac{\epsilon_{Di}}{\lambda_i} \right.$$

$$\left. + \frac{\sigma_{ff} \alpha_2}{A_{235} \sum_{fa}} \sum_{i=1}^{6} \frac{\epsilon_{fDi}}{\lambda_i} \right\} \cdot \quad (31)$$

wherein:
$t_2$ is the end of the measurement period,
$t_1$ is the start of measurement period after the beginning of the neutron burst,
$Q$ is the average neutron output,
$t_T$ is the total measurement time,
$\Delta T$ is the time width of neutron burst,
$\Sigma_D$ is the macroscopic absorption cross-section for neutron detector,
$v_{cd}$ is the neutron velocity for cadmium cutoff,
$t_s$ is the slowing-down time to cadmium cut-off energy,
$\nu$ is the number of secondary neutrons per fission,
$\tau$ is the mean lifetime of thermal neutrons in the medium,
$pU$ is the percent weight content of uranium in the ore,
$\sigma_f$ is the thermal fission cross-section of $^{235}U$,
$\alpha_1$ is the percent isotopic abundance of $^{235}U$,
$\pi$ is the density of the uranium ore,
$N_0$ is Avogadro's number,
$A_{235}$ is the atomic mass of $^{235}U$,
$A_{238}$ is the atomic mass of $^{238}U$,
$\bar{v}$ is the thermal neutron velocity,
$\Sigma_a$ is the macroscopic absorption cross-section of the medium for thermal neutrons,
$\Delta t$ is $t_2 - t_1$
$T$ is the repetition time of neutron bursts,
$\epsilon_{Di}$ is the number of delayed neutrons per fission for the $i$th group of delayed neutrons,
$\lambda_i$ is the decay constant for the $i$th group of delayed fission neutrons,
$\sigma_{ff}$ is the fast fission cross-section for $^{238}U$,
$\alpha_2$ is the isotopic abundance of $^{238}U$ (in percent),
$\Sigma_{fa}$ is the macroscopic absorption cross-section for fast neutrons, Equation 12 establishes the relationship between neutron count and uranium ore grade for epithermal neutron detection and equation 31 establishes the relationship between neutron count and uranium ore grade for detection of thermal neutrons resulting from fast neutron and thermal neutron delayed fission.

Among the rock parameters presented as independent variables in one or both of these equations are bulk density $\pi$ (equations 12 and 31), the macroscopic absorption cross section for thermal neutrons $\Sigma_a$ (equations 12 and 31), and the slowing down time of neutrons $t_s$ (equation 12). Czubek on pages 172 and 173 discusses the necessity for making compensatory measurements for bulk density, slowing down time, and the thermal neutron mean life, also referred to as neutron lifetime $\tau$. He states that the bulk density can be determined by gamma-gamma density logging, the slowing down time from porosity measurements obtained by conventional neutron logging or by employing the neutron generator, and the mean life (or lifetime) by pulsed neutron logging.

SUMMARY OF THE INVENTION

In accordance with the present invention, there is provided a new and improved uranium borehole assay process in which one log representative of delayed fission neutron (DFN) measurements in a subterranean formation is correlated with a second log representative of the capability of the formation to moderate and absorb neutrons in order to arrive at a corrected value of the uranium content of the formation. In carrying out the invention, the DFN log is obtained by irradiating the formation with repetitive bursts of fast neutrons and during time intervals between the fast neutron bursts and after dissipation of the original source neutrons, a detector is operated in order to detect radiation attendant to delayed neutrons resulting from the neutron fission of uranium. The output from this detector is applied to a suitable recording system in order to obtain a DFN uranium assay log. In addition, the formation of interest is irradiated with a source of fast neutrons whereby the source neutrons are moderated within the formation to low energy levels and are subject to absorption within the formation. A detector is operated in order to detect secondary radiation attendant to the low energy neutrons as such neutrons are influenced by moderation and absorption of the source neutrons. The output from this detector is applied to a suitable recording system in order to obtain a log representative of the response of the formation to moderation and absorption of neutrons within the formation. These two logs then are correlated in order to determine the true value of uranium content of the formation.

In a preferred embodiment of the invention, the radiation detected in both logging procedures comprises thermal neutrons. In addition, it is preferred in carrying out the invention to employ a continuous source of fast neutrons in obtaining the log representative of the moderation and absorption response of the formation to neutrons.

In accordance with a further aspect of the present invention, there is provided a technique for obtaining a suite of calibration functions defining the relationships between the quantity of delayed fission neutrons indicated by a DFN log and the concentration of uranium for different moderation and absorption responses of a formation to neutrons. In obtaining the above-described calibration functions, a rock formation is irradiated with fast neutrons and resulting secondary radiation is detected and recorded in order to obtain a log representative of the moderation and absorption response of the formation to neutrons. A plurality of DFN logs are obtained for each of a first set of a plurality of formations which have substantially the same response as the first formation described above and different known uranium concentrations. In addition, DFN assay and response logs are obtained for each of a second set of a plurality of formations. The formations in this second set exhibit different responses but have substantially the same concentration of an element which responds to irradiation with fast neutrons to emit delayed neutrons. The response and DFN assay logs obtained with respect to the second set of formations are then correlated with one another to obtain a functional relationship between the results of the DFN assay logs and the response logs. For example, the results of the response logs may be plotted versus the results of the DFN assay logs. This functional relationship is then correlated with the response log obtained for the first formation described above to develop normalization factors for a plurality of quantitatively different values of the response log. These normalization factors are then applied to the functional relationship derived for the first set of formations to develop a suite of calibration functions for different values of the response log.

BRIEF DESCRIPTION OF THE DRAWINGS

FIG. 1 is a schematic illustration of a DFN assay logging system employed in the present invention;

FIG. 2 is a schematic illustration of a neutron-neutron response logging system employed in the present invention;

DESCRIPTION OF SPECIFIC EMBODIMENTS

Figure 3:
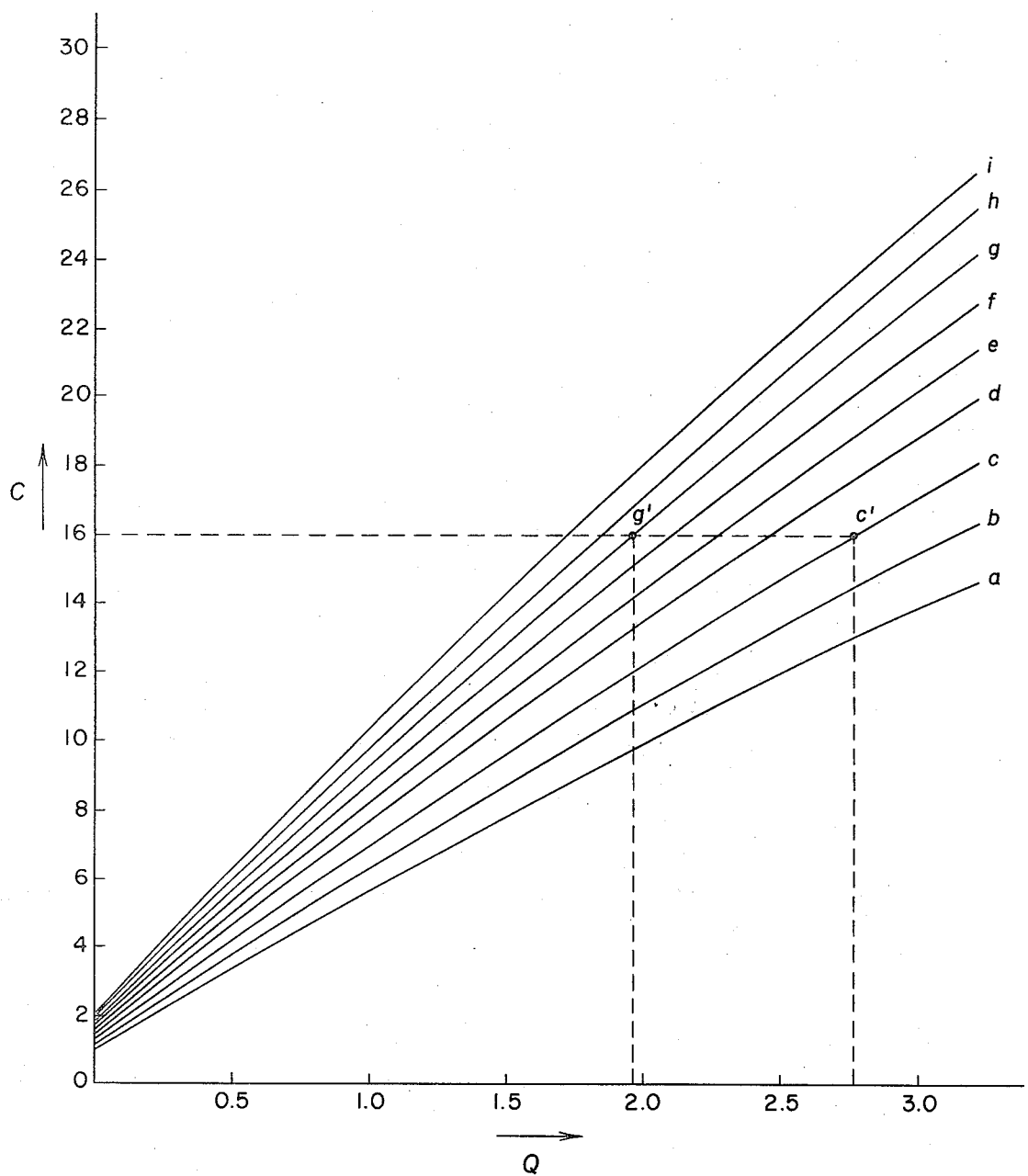
FIG. 3 is a graphical illustration of calibration functions employed in correlating DFN assay and response logs in accordance with a preferred embodiment of the present invention.

The two procedures fundamental to the practice of the present invention are logging of a suspected uranium bearing formation in order to obtain a DFN assay log and logging of the formation in order to obtain a response log indicative of the response of the formation to moderation and absorption of neutrons. DFN assay logging will be described here briefly with reference to FIG. 1 in order to afford a foundation for the later description of the relationship between the DFN assay logging procedure and the response logging procedure. For a more detailed description of DFN assay logging, reference is made to the aforementioned U.S. Pat. No. 3,686,503 to Givens et al.

Turning now to FIG. 1, there is illustrated a logging tool 10 which is suspended from a cable 12 within a borehole 14 traversing subterranean formation of interest indicated by reference character 16. Formation 16 is a suspected uranium bearing formation which has been located by a suitable preliminary logging procedure. Signals from the logging tool 10 are transmitted uphole via conductors in cable 12 to an uphole analysis and recording circuit 20 at the surface. Circuit 20 operates on the downhole measurements and applies output functions to suitable recording means as explained hereinafter. A depth indicating means such as a measuring sheave 21 produces a depth signal which is recorded in order that the downhole measurements may be correlated with the depth at which they are taken. The cable 12 is wound on a motor-driven drum 19 and the several conductors in cable 12 are connected via slip ring and brush connections (not shown) to circuit 20.

The logging tool 10 comprises a pulsed neutron source 22 for irradiation of formation 16 with bursts of fast neutrons and a radiation detector 24 for the detection of secondary radiation attendant to delayed neutrons resulting from neutron fission of uranium. The source 22 may be an accelerator-type deuterium-tritium source of fast neutrons and the radiation detector may take the form of a thermal neutron detector. For example, detector 24 may comprise one or more helium-3 proportional counters of the type described in U.S. Pat. No. 3,102,198 to Bonner. Such helium-3 counters are responsive primarily to thermal neutrons and become essentially nonresponsive to neutrons of progressively higher energy levels. The source 22 is operated cyclically to produce time-spaced bursts of fast neutrons, with the time intervals between the fast neutron bursts being greater than the time required for the dissipation within the formation of the source neutrons. During the time intervals between the bursts and after dissipation of the source neutrons, the detector 24 is operated in conjunction with suitable gating circuitry as described hereinafter to detect thermalized neutrons resulting from delayed neutron fission of uranium. The gating circuitry may be employed to render detector 24 operative or responsive to the secondary radiation only during the desired measuring intervals. Usually, however, the detector 24 will be continuously responsive to the secondary radiation and the gating circuitry will be employed to gate the detector output to the appropriate recording means during the desired measurement intervals.

The logging tool 10 also comprises a second radiation detector 26 which, as described in the aforementioned U.S. Pat. No. 3,686,503 and also in U.S. Patent No. 3,688,117 to Wyatt W. Givens, is employed to indirectly monitor the output of source 22. Detector 26, which may take the form of a conventional gamma ray counter, is used to detect delayed gamma rays which are emitted from oxygen within the formation upon irradiation with fast neutrons from source 22. The reaction by which these gamma rays are emitted is

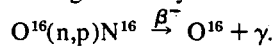

$$O^{16}(n,p)N^{16} \xrightarrow{\beta^-} O^{16} + \gamma. \qquad (1)$$

Nitrogen-16 decays by beta emission in accordance with the above reaction with a half life of 7.14 seconds. For any given amount of oxygen nuclei, the number of gamma rays emitted, which are predominantly at energies of 6.14 Mev, 6.92 Mev, and 7.12 Mev, is proportional to the quantity of fast neutrons emitted from source 22. Since as explained in greater detail hereinafter the oxygen concentration of most subterranean formations is relatively constant, the count rate of delayed gamma rays resulting from reaction (1) above provides a measure of the intensity of neutron output from source 22.

Turning now to a description of the uphole portion of the DFN assay system, the circuitry 20 comprises a time base generator 28, delay gate generators 30 and 31, gated scalers 33 and 34, and a preset timer 36. Timer base generator 28 is employed to generate a train of triggering pulses for operation of the downhole neutron source 22 and the delay gate generators 30 and 31. The delay gate generators respond to the triggering pulses from time base generator 28 to enable scalers 33 and 34 to count and record the outputs from detectors 24 and 26, respectively, during the desired time intervals.

In operation of the system illustrated in FIG. 1, the logging tool 10 is lowered to the desired location opposite formation 16. The pulse output signal from time base generator 28 is adjusted to give the desired pulse repetition rate from source 22 and is applied via conductor 38 to a downhole control unit (not shown) in logging tool 10. For example, the source may be operated so that it is pulsed to give two fast neutron bursts per second with each burst having a duration of about 3 microseconds. The output signal from the time base generator also is applied via conductors 40 and 41 to delay gate generators 30 and 31, respectively. Delay gate generator 30 operates in response to each pulse from generator 28 to enable scaler 33 to begin counting at some desired time interval after the fast neutron burst from source 22. For example, the scaler 33 may begin counting at about 2 to 5 milliseconds after each neutron burst and to continue counting until the start of the next neutron burst. The output from the detector 24 is applied through suitable amplification and pulse height discrimination stages (not shown) to the gated scaler 33. The output from detector 26 is likewise transmitted to the surface and applied through suitable amplification and pulse height discrimination stages (not shown) to gated scaler 34. Thus scaler 34 records a gamma ray count which is proportional to the number of neutrons produced by the downhole source 22. Scaler 34 normally will be enabled for counting by delay gate generator 31 for the same period between neutron bursts as scaler 33.

In one mode of operation, the scaler 34 records the gamma ray count (indicative of the number of neutrons from source 22) to a predetermined value and then applies a control signal by way of conductor 43 to turn off the time base generator 28 which, as described above, controls pulsing of the neutron source and counting by gated scalers 33 and 34. This will terminate the downhole neutron output from source 22 as well as the counting by both of the scalers 33 and 34, thus completing an assay period for formation 16. In an alternative mode of operation the timer 36 is set to a desired time interval and after the lapse of this interval a control signal is applied by way of conductor 46 to turn off the time base generator 28. This again terminates the downhole neutron pulsing operation as well as the counting by both of scalers 33 and 34. In this embodiment the timer 36 may be set to any suitable time interval, but it usually will be desirable to set the timer so that it generates a control signal after a predetermined interval of about three minutes. To accommodate these two modes of operation, conductors 43 and 46 are provided with switches 43a and 46a, respectively. In a preferred mode of operation where the time base generator is controlled by scaler 34, these switches will be in the position shown whereas if the generator is to be controlled by timer 36, switch 46a will be closed and switch 43a open. Of course, if the alternative capability afforded by timer 36 is not desired, this element along with conductor 46 and switches 43a and 46a may be omitted.

As is apparent from the foregoing description, DFN logging involves the occurrence of fast neutrons within the formation under two different circumstances. The first is when the formation is irradiated with fast neutrons from the pulsed source 22 and the second is when delayed neutrons are emitted by the fission products of uranium.

Both the source and the delayed fission neutrons are subject to certain nuclear processes within the formation which influence the results obtained by a DFN assay log. In this regard, when fast neutrons, regardless of their origin, are produced within a subterranean formation, they are moderated (or slowed down) to lower energy levels until they ultimately form a thermal neutron population. The moderation of fast neutrons is accomplished by the nuclear collision processes referred to as elastic scattering and inelastic scattering. At the higher energy levels above about 1 Mev, both elastic and inelastic scattering play prominent roles in the moderation of neutrons. However, as the fast neutron declines to an energy of about 1 Mev, the elastic scattering process becomes the predominant factor. In elastic scattering the number of nuclear collisions required for a fast neutron of a given energy level to become moderated to the thermal neutron energy level varies directly with the atomic weight of the nuclei available for collision. In subterranean formations the pore spaces are almost invariably filled with hydrogenous fluids, thus the hydrogen nuclei are the predominant factor in the moderation process in subterranean formations. The number of hydrogen nuclei is of course related to the fluid content of the formation which in turn is related to the porosity of the formation.

Upon reaching the thermal energy level, neutrons diffuse through the formation until they are captured by nuclei. The capture of a thermal neutron is accompanied by the emission of one or more gamma rays from the capturing nucleus. The capacity of a formation to capture thermal neutrons, or stated otherwise the capacity to absorb thermal neutrons, is measured by the macroscopic absorption cross section $\Sigma_a$. The value of $\Sigma_a$ for a given formation in turn depends upon the microscopic absorption cross section of the various elements found in the formation. The presence of hydrogen, which has a microscopic absorption cross section of 0.33 barns has a pronounced effect on the value of $\Sigma_a$. Of course, the presence of an element such as chlorine which exhibits a much higher microscopic absorption cross section (34 barns) will result in a still higher value of $\Sigma_a$ than would otherwise be the case.

The response of a formation for moderation of fast neutrons and absorption (capture) of thermal neutrons involves both a "front-end" effect with respect to neutrons from the source and a "back-end" effect with respect to neutrons from the delayed fission processes. The explanation of the back-end effect on the radiation count obtained with a DFN assay log is relatively simple. All other things being equal, as the moderation response or the absorption response of the formation is increased, the count obtained with the DFN assay log will be decreased. Thus, in a formation having a high moderation response, the delayed fission neutrons once emitted are slowed down faster to the thermal energy level and thus take longer to migrate to the detector in the DFN tool and have an increased exposure to capturing nuclei. In addition, as the absorption response of the formation is increased, more neutrons, once they have moderated to the thermal energy level, will be captured.

The front-end effect with respect to the source neutrons is much more complex. Considering first the case of a formation having a high moderation response, the source neutrons will be slowed down to the thermal energy level more quickly and thus the depth of penetration into the formation by neutrons, be they fast or thermal neutrons, available for the neutron fission reaction is decreased. This of course limits the depth of investigation of the process. However, it would seem that since the depth of penetration of neutrons is decreased, the actual density of source neutrons in a given zone of the formation in close proximity to the detector of the DFN tool would be increased. As a result there would be a greater intensity of delayed neutrons emitted by the fission products in relatively close proximity to the detector although the total overall quantity of such neutrons, considering both proximate and remote locations, would be lower. Considering the effect of a high absorption response of the formation with respect to the source neutrons, the neutrons once moderated to thermal energy level would be captured at a higher rate than in the case of a formation having a relatively low absorption response. Thus the quantity of neutrons ultimately available for the uranium fission reactions would be decreased, resulting in fewer fission reactions. From the foregoing, it can be seen that the front-end effect presents a trade-off between several competing factors, one of which tends to increase the density of neutrons available for the neutron fission reactions in a location proximate with respect to the radiation detector in the tool, although at the expense of neutron densities in more remote locations and the total overall neutron density; and the other of which through the capture phenomenon tends to decrease the number of source neutrons available ultimately for the neutron fission reactions.

In accordance with the present invention, the formation of interest is logged in order to obtain a response log indicative of the response of the formation to both moderation and absorption of neutrons and not significantly responsive to neutrons produced in the formation. The response log thus obtained then may be correlated with the DFN assay log to compensate for both the front-end and back-end effects described and to arrive at a quantitative value of the uranium content of the formation.

Turning now to FIG. 2, there is illustrated a logging system which may be employed to obtain the response log of the present invention. This system comprises a logging tool 50 which is suspended in the borehole 14 by means of a cable 52 supported on a motor-driven drum 53. The logging tool comprises a fast neutron source 54 and a radiation detector 55. The signal output from the detector 55 is transmitted uphole by means of a conductor in cable 52 to a recording system 57 which records the count rate of the detector. As the logging tool is moved through the well, a depth indicating means such as a measuring sheave 58 produces a depth signal which is applied also to recorder 57 thus correlating the downhole measurements with the depths at which they are taken.

The logging tool 50 may be of the type conventionally employed for porosity measurements in oil well logging. The source preferably is a continuous chemical source, for example, of the type comprising a mixture of an alpha emitter such as americium-241 with beryllium-9. Also, an ON-OFF type of chemical source may be used. A suitable source of this nature is disclosed in U.S. patent application Ser. No. 255,112, filed May 19, 1972 by Richard L. Caldwell, and entitled METHOD AND APPARATUS FOR RADIOACTIVE WELL LOGGING. This source comprises separate target and emitter components which are placed in an active position within the well for continuous neutron logging and then placed in an inactive position before the tool is withdrawn from the well.

Such chemical sources have a substantially constant neutron output intensity which decays slowly with time. Thus they offer an advantage over accelerator-type sources such as those employing the deuterium-tritium reaction which are characterized by a highly variable neutron output.

While in theory the radiation detector 55, like the detector 24 shown in FIG. 1, may be either a neutron detector or a gamma ray detector (responsive to gamma rays attendant to the capture of thermal neutrons) the use of a gamma ray detector would require that complex energy level discrimination be carried out in order to discriminate the capture gamma rays from gamma rays resulting from the natural radioactivity of any uranium present and gamma rays resulting from the activation of oxygen-16. Thus it will be preferred that the radiation detector 55 take the form of a thermal neutron detector such as a helium-3 proportional counter of the type described above.

In carrying out the response logging, continuous neutron sources of the type described above usually will be preferred since they are relatively simple and inexpensive. However, the response logging can be carried out with a pulsed neutron source and this may be advantageous in cases where additional information such as neutron decay measurements are desired. If a pulsed source is used, the detector output for the response log should be ungated, or, if gated, care should be exercised to ensure that the gated detector output is representative of both moderation and absorption of neutrons. A suitable pulsed neutron logging system which may be employed in obtaining a response log is disclosed in U.S. patent application Ser. No. 251,629, filed May 9, 1972 by Wyatt W. Givens, and entitled METHOD AND APPARATUS FOR RADIOACTIVE WELL LOGGING. In the system disclosed in that application, the ungated measuring channel disclosed for obtaining porosity measurements can be used to obtain a response log for use in the present invention.

The response log may be run in the borehole either prior to or subsequent to the DFN assay log. In most cases it will be expedient to run the response log on the same logging run as the reconnaisance log, which is carried out prior to the DFN assay log.

Correlation of the DFN assay log and the response log may be accomplished by any suitable technique to arrive at the true value of the uranium content of formation 16. A preferred correlation technique is to employ a suite of calibration functions which define the relationship between the quantitative values obtained by the DFN assay log and the uranium concentration for different values obtained by the response log. The response log for formation 16 is compared with these calibration functions to select the function corresponding most closely with the value indicated by the response log. The selected calibration function is then compared with the DFN assay log in order to obtain the uranium concentration of the formation.

Turning now to FIG. 3, there is illustrated graphically a suite of calibration functions which may be employed in carrying out correlation of the DFN assay and response logs as described above. In FIG. 3, each of the calibration functions illustrated by curves $a$ through $i$ represents a plot, corresponding to a given response log value, of the DFN assay count C in ordinate versus uranium concentration Q in abscissa. The several variables may of course be expressed in any convenient units.

For the purpose of illustration, it will be assumed that the DFN log count is given in thousands of neutrons counted by scaler 33 (FIG. 1) per assay period and the uranium concentration in pounds of triuranium octoxide per cubic foot of formation; with functions $a$ through $i$ corresponding respectively to response log values of from 250 to 650 neutrons per second in increments of 50 neutrons per second. Thus, curve $a$ is illustrative of a response log count rate of 250 neutrons per second, curve $b$ corresponds to a count rate of 300 neutrons per second, etc.

From an examination of FIG. 3, it can be seen that the uranium concentration of the formation under investigation can readily be detected from the values obtained from the DFN assay and response logs. For example, should the DFN assay log produce a count of 16,000 neutrons for the formation of interest and the response log a count rate of 550 neutrons per second for this same formation, curve $g$ would be selected as the appropriate calibration function and the abscissa of point $g'$ on curve $g$ would indicate a uranium ore concentration of slightly less than two pounds of triuranium octoxide per cubic foot of formation. If instead of 550 neutrons per second, the response log should indicate a count rate of 350 neutrons per second for the formation under investigation, one would select curve $c$ with the abscissa of point $c'$ thereon indicating a concentration of about 2.8 pounds per cubic foot. It should be noted that even in formations having a very high uranium content, the contribution of prompt and delayed neutrons from the fission process is much less than the statistical variation inherent in the response log. That is to say that the response log will give values within the statistics of the measurement in ore formations and barren formations having all other properties the same. This is especially so when the response log is carried out with a chemical neutron source since chemical sources are of a much lower intensity than accelerator sources.

It is to be recognized that the calibration functions employed in carrying out the invention can be developed to any desired resolution, for example, in increments corresponding to 10 counts per second rather than 50 counts per second as stated above. Also from the foregoing description, it will be apparent to those skilled in the art that correlation of the DFN assay and response logs employing calibration functions as described above can be carried out by machine implementation. For example, several calibration functions could be represented by analog signals generated by a special purpose analog computation machine or correlation could be accomplished by means of a properly programmed digital computer.

Calibration functions such as those exemplified by curves $a$ through $i$ of FIG. 3 may be developed by any suitable technique. Perhaps the most straightforward method of producing the calibration functions would be to obtain DFN assay logs and response logs for a group of formations exhibiting a common response factor and having different known uranium concentrations. This procedure could then be repeated for successive groups of formations with each formation group having a common response factor which is different from the response factor of the preceding group. Since, as noted previously, hydrogen nuclei in a formation have a pronounced effect on both moderation of fast neutrons and capture of thermal neutrons, the response factor for a given formation will vary with its hydrogen content. Different hydrogen concentrations are readily available from formations of different porosities which are saturated with a hydrogenous fluid such as water or oil. Greater difficulties are encountered with respect to employing large groups of formations of known uranium content. For example, to develop nine calibration functions such as disclosed in FIG. 3 and the attendant text, it theoretically would be necessary to employ nine groups of formations within the several formations in each group having the same response factor, for example, as resulting from the same porosity, and different uranium concentrations. This would become an expensive and time consuming procedure, particularly since it is desirable to develop a suite of calibration functions for each combination of DFN and response logging tools employed.

In accordance with a further aspect of the invention there is provided a technique whereby calibration functions such as those described previously with reference to FIG. 3 may be obtained without resorting to such a large number of measurements as would be involved in a technique as described above. This method is carried out with respect to a plurality of formations which have a substantially constant concentration of an element which responds to irradiation with fast neutrons to emit delayed neutrons and within which the response factor may vary quantitatively. More particularly, this embodiment of the invention may be employed to take advantage of the fact that oxygen is present in most naturally occurring rock formations in a substantially constant amount. In this respect, it has been found that most formation matrices contain about $4.7 \times 10^{22}$ oxygen atoms per cubic centimeter and with a variance of oxygen content from formation to formation of not more than about 7 to 8 percent. A natural drilling mud contains about $3.6 \times 10^{22}$ oxygen atoms per cubic centimeter with very little variation of oxygen content throughout a borehole for depths less than 4,000 feet. Since the borehole fluid is in closest proximity to a logging tool, the maximum of 7 to 8 percent variation in the formation will not produce that great a variation in oxygen as seen by the logging tool. As disclosed in the aforementioned U.S. Pat. No. 3,686,503 to Givens et al., oxygen-17, which is present in an isotopic abundance of about 0.037 percent responds to irradiation with fast neutrons of an energy greater than 7.93 Mev to produce delayed neutrons. The reaction is

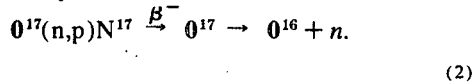

(2)

The neutrons produced by this reaction have a maximum energy of about 2.2 Mev and the half life of the beta decay is on the order of 4.14 seconds. Thus, the neutrons resulting from this reaction are available at about the same time as the shorter lived, more abundant neutrons resulting from the delayed fission reaction of uranium. Since oxygen is present in both uranium ore and nonuranium ore formations, the neutrons resulting from reaction (2) above contribute to the background counts in uranium assay logging. However, in this invention these neutrons are employed to advantage in deriving calibration functions for use in correlating the DFN assay and response logs.

In carrying out this aspect of the invention a DFN assay log is run with respect to a first set of formations, each of which exhibits a different uranium ore and all of which have substantially the same response to moderation and capture of thermal neutrons. For example, this first set may include five formations or calibration models in which the uranium ore content varies incrementally from zero to some desired upper concentration limit. The formations are all of substantially the same porosity and are saturated with a hydrogenous fluid so that the response for moderation and absorption is substantially the same in each formation. The results of the several DFN assay logs are recorded as a function of uranium concentration. For example, as more specifically shown in FIG. 4, the count C from the DFN logs is plotted in ordinate versus the uranium per unit volume, Q, in abscissa to provide a curve 60.

In addition, a response log, such as may be obtained with a neutron-neutron logging tool as described above with respect to FIG. 2, is run for one of these formations or in another formation exhibiting the same response factor, for example, due to the same porosity and fluid saturation, as the formations in which the DFN log was run. The count rate value obtained with this log will be referred to hereinafter as $R_1$. Preferably, for reasons which will become apparent from the following description, the neutron-neutron log is run in a formation in which the uranium concentration is zero.

Figure 5:
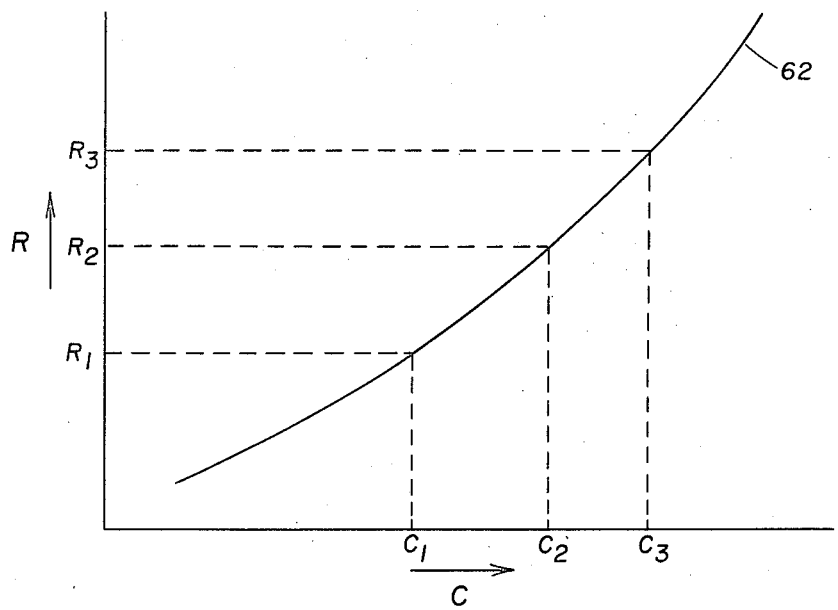

The DFN assay logs and response logs also are carried out in a second set of formations. Each of these formations has a constant uranium concentration which is the same as the uranium concentration of the formation which was the subject of the response log described in the preceding paragraph. Preferably, the uranium content of the formations will be zero, thus enabling the use of naturally occurring formations which exhibit a substantially constant oxygen content. Thus the delayed neutrons detected during the DFN assay logging will be those resulting from the oxygen-17 reaction described above. The formations comprising this second set exhibit different response factors such as may be due to different formation porosities. With respect to these formations, the results of the DFN logs are recorded as a function of the response logs. Thus as shown in FIG. 5 the count rate R from the neutron-neutron logs are plotted in ordinate versus the count C from the DFN logs for each of the respective formations to provide a function illustrated by curve 62 in FIG. 5.

Figure 4:
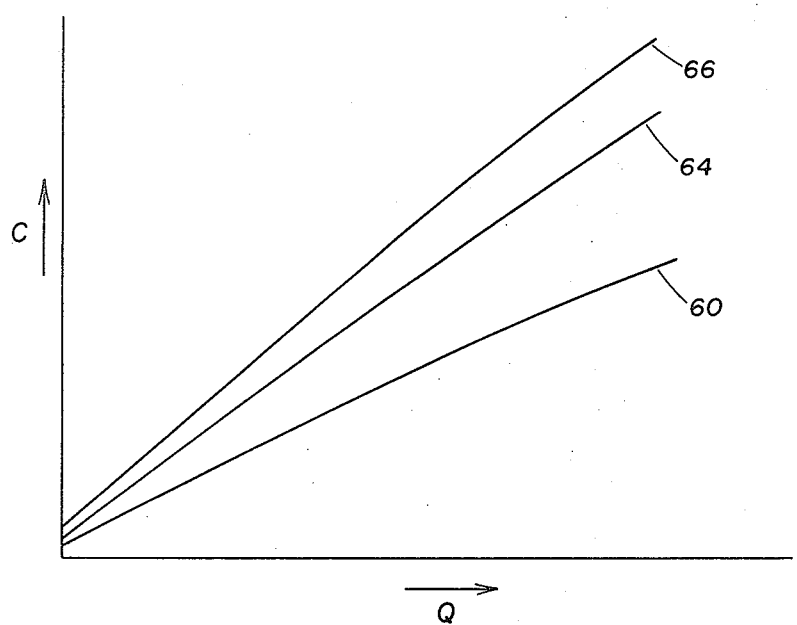
FIGS. 4 and 5 are graphical illustrations showing the relationships between empirical measurements employed in deriving calibration functions.

From the results obtained by the foregoing procedures, a suite of calibration functions can be developed for use in correlating DFN assay and response logs. Curve 60 in FIG. 4 represents a calibration function corresponding to a formation in which the response log gives a count rate of $R_1$ counts per second. From this curve and from curve 62 in FIG. 5, additional calibration functions can be developed for formations giving different count rates. Thus, to generate a calibration function corresponding to a formation giving a response log value of $R_2$ counts per second, the value $R_2$ is located on the ordinate of FIG. 5 and from this the corresponding value $C_2$ of the DFN assay count is determined on the abscissa. The value $C_1$ corresponding to count rate $R_1$ is determined in a like manner. The ratio of $C_2/C_1$ is then determined and this ratio is employed to generate a curve 64 shown in FIG. 4 for the count rate $R_2$. This is accomplished by multiplying ordinate values on curve 60 by the ratio $C_2/C_1$ to determine the corresponding ordinate values for curve 64. This same procedure can be employed to generate such additional calibration functions as may be desired. For example, for response log count rate of $R_3$, the corresponding value $C_3$ is found on the abscissa of FIG. 5 and the ratio $C_3/C_1$ is employed to generate a third calibration function 66.

From the foregoing description, it will be recognized that this embodiment of the invention enables the generation of the desired calibration functions from a relatively small number of empirical measurements. This is particularly advantageous since it is desirable to generate separate calibration functions for each set of DFN assay and response logging systems employed since the characteristics of the logging systems will vary from one system to another. For example, two neutron-neutron logging systems run with respect to the same formation may give count rates which vary considerably depending on source strength, detector sensitivity, and source-to-detector spacing. Similar variance in values will be experienced when going from one DFN assay logging system to another.

The various rock formations employed in the empirical procedures described above may be synthetic formations or they may be naturally occurring earth formations. In practice, it will usually be desirable to synthesize the first group of formations described above in order that the actual uranium concentrations are known to a high degree of accuracy. As noted previously, one of the formations in this first group preferably has a uranium concentration of zero. The second group of formations desirably will be naturally occurring earth formations having no uranium content. Thus the delayed neutrons detected by the DFN assay log will be those resulting from the oxygen-17 reaction. Since the concentration of oxygen in naturally occurring earth formations is relatively constant as described above, this provides an economical means of arriving at the informations shown in FIG. 5.

What is claimed is:

1. In a method of assaying for uranium ore in natural earth formations traversed by a borehole, the steps comprising:
    a. irradiating a formation of interest with a source of fast neutrons whereby neutrons from said source are moderated in said formation to lower energy levels and are subject to absorption,
    b. detecting secondary radiation attendant to said lower energy neutrons originating from said source at a time when said lower energy neutrons exist in said formation,
    c. recording the count rate of radiation detected in step (b) to obtain a log representative of the response of said formation to moderation and absorption of neutrons,
    d. irradiating said formation with repetitive bursts of fast neutrons, the time intervals between said bursts being greater than the time required for dissipation of neutrons originating in said bursts,
    e. during time intervals between said bursts and after dissipation of neutrons originating in said bursts operating a detector to detect radiation attendant to delayed neutrons resulting from neutron fission of uranium,
    f. recording radiation detected in step (e) to obtain a log representative of uranium content in said formation, and
    g. correlating the logs obtained in steps (c) and (f) to determine a corrected value of uranium content in said formation.

2. The method of claim 1 wherein the radiation detected in step (b) comprises neutrons from said lower energy neutron population.

3. The method of claim 2 wherein the neutrons detected in step (b) comprise thermal neutrons.

4. The method of claim 1 wherein the radiation detected in step (e) comprises thermal neutrons.

5. The method of claim 1 wherein the source employed in step (a) is of a substantially, constant neutron intensity.

6. The method of claim 1 wherein the irradiation in step (a) is carried out with a continuous source of fast neutrons.

7. The method of claim 1 further comprising the steps of:
    h. concomitantly with step (d) operating a detector separate from the detector of step (e) to detect delayed radiation resulting from irradiation of a designated element with said bursts of fast neutrons,
    i. recording radiation detected in step (h) to obtain a representation of the quantity of neutrons produced in said bursts.

8. The method of claim 7 wherein the radiation detected in step (h) comprises gamma rays emitted from oxygen in accordance with the reaction:

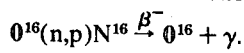

9. In a method of assaying for uranium ore in natural earth formations traversed by a borehole, the steps comprising:
    a. irradiating a formation of interest with a source of fast neutrons whereby said fast neutrons are moderated in said formation to form a thermal neutron population subject to absorption within said formation,
    b. detecting thermal neutrons from said thermal neutron population,
    c. recording the count rate of thermal neutrons detected in step (b) to obtain a log representative of the response of said formation to moderation and absorption of neutrons,
    d. irradiating said formation with repetition bursts of fast neutrons from another source of fast neutrons, the time intervals between said bursts being greater than the time required for dissipation of neutrons originating in said bursts,
    e. during time intervals between said bursts and after dissipation of neutrons originating in said bursts operating a detector to detect delayed thermal neutrons resulting from neutron fission of uranium,
    f. recording delayed neutrons detected in step (e) to obtain a log representative of uranium content in said formation, and
    g. correlating the logs obtained in steps (c) and (f) to determine a corrected value of uranium content in said formation.

10. The method of claim 9 further comprising the steps of:
    h. concomitantly with step (d) operating a detector separate from the detector of step (e) to detect delayed radiation resulting from irradiation of a designated element with said bursts of fast neutrons, i. recording radiation detected in step (h) to obtain a representation of the quantity of neutrons produced in said bursts.

11. The method of claim 10 wherein the radiation detected in step (h) comprises gamma rays emitted from oxygen in accordance with the reaction:

$$O^{16}(n,p)N^{16} \xrightarrow{\beta^-} O^{16} + \gamma.$$

12. The method of claim 9 wherein said corrected value of uranium content is determined by comparing the log obtained in step (c) with a suite of calibration functions defining the relationships between the quantity of delayed neutrons detected and the concentration of uranium for different values of moderation and absorption of neutrons, selecting a calibration function which corresponds to the response value indicated by the log of step (c), and comparing the log of step (f) with said selected calibration function to determine said corrected value of uranium content.

13. The method of claim 9 wherein the source employed in step (a) is of a substantially constant neutron intensity.

14. The method of claim 13 wherein the irradiation in step (a) is carried out with a continuous source of fast neutrons.

15. In the development of criteria for use in correcting a uranium assay log of the type obtained by irradiating a natural earth formation with fast neutrons and detecting radiation attendant to delayed neutrons resulting from neutron fission of uranium, the method comprising:
a. irradiating a formation with fast neutrons whereby said fast neutrons are moderated in said formation to lower energy levels and are subject to absorption,
b. detecting secondary radiation attendant to said lower energy neutrons,
c. recording radiation detected in step (b) to obtain a log representative of at least one response factor of said formation to said neutrons,
d. in a first set of a plurality of formations having a response factor substantially the same as that recited in step (c) and having different known uranium concentrations, irradiating each of said formations with repetitive bursts of fast neutrons, the time intervals between said bursts being greater than the time required for dissipation of neutrons originating in said bursts,
e. for each of the formations recited in step (d) and during time intervals between said bursts and after dissipation of neutrons originating in said bursts operating a detector to detect radiation attendant to delayed neutrons resulting from neutron fission of uranium,
f. recording radiation detected in step (e) to obtain a log of radiation as a function of uranium concentration,
g. in a second set of a plurality of formations having a substantially constant concentration of an element which responds to irradiation with fast neutrons to emit delayed neutrons and in which said response factor varies quantitatively, irradiating each of said formations with fast neutrons whereby said fast neutrons are moderated therein to lower energy levels, and are subject to absorption,
h. for each of the formations recited in step (g) detecting radiation attendant to said lower energy neutrons,
i. irradiating each of the formations recited in step (g) with repetitive bursts of fast neutrons,
j. for each of the formations in step (g) and during time intervals between said bursts and after dissipation of neutrons originating in said bursts detecting radiation attendant to delayed neutrons emitted by said element,
k. recording the radiation detected in step (h) as a function of the radiation detected in step (j),
l. correlating the function of step (k) with the log of step (c) to develop normalization factors for a plurality of values of said response factor, and
m. applying said normalization factors to the log of step (f) to develop a suite of calibration functions for different values of said response factor.

16. In the development of criteria for use in correcting a uranium assay log of the type obtained by irradiating a natural earth formation with fast neutrons and detecting radiation attendant to delayed neutrons resulting from neutron fission of uranium, the method comprising:
a. irradiating a formation with fast neutrons whereby said fast neutrons are moderated in said formation to form a thermal neutron population,
b. detecting thermal neutrons from said thermal neutron population,
c. recording radiation detected in step (b) to obtain a log representative of a response factor of said formation to moderation and absorption of neutrons, d. in a first set of a plurality of formations having a response factor substantially the same as that recited in step (c) and having different known uranium concentrations, irradiating each of said formations with repetitive bursts of fast neutrons, the time intervals between said bursts being greater than the time required for dissipation of neutrons originating in said bursts,
e. for each of the formations recited in step (d) and during time intervals between said bursts and after dissipation of neutrons originating in said bursts operating a detector to detect delayed neutrons resulting from neutron fission of uranium,
f. recording the quantity of neutrons detected in step (e) to obtain a log of delayed neutron counts as a function of uranium concentration,
g. in a second set of a plurality of naturally occurring earth formations having a substantially constant oxygen concentration and different response factors for moderation and absorption of neutrons, irradiating each of said formations with fast neutrons whereby said fast neutrons are moderated therein to form a thermal neutron population,
h. for each of the formations recited in step (g) detecting thermal neutrons from said thermal neutron population,
i. irradiating each of the formations recited in step (g) with repetitive bursts of fast neutrons,
j. for each of the formations in step (g) and during time intervals between said bursts and after dissipation of neutrons originating in said bursts detecting delayed neutrons emitted by oxygen,
k. recording the radiation detected in step (h) as a function of the radiation detected in step (j), l. correlating the function obtained by step (k) with the log of step (c) to develop normalization factors for a plurality of values of said response factor, and m. applying said normalization factors to the log of step (f) to develop a suite of calibration functions for different values of said response factor.

* * * * *